US012284419B2

(12) United States Patent
Delserro et al.

(10) Patent No.: US 12,284,419 B2
(45) Date of Patent: Apr. 22, 2025

(54) LIVE STREAM EVENT MANAGEMENT SYSTEMS AND METHODS

(71) Applicant: Verizon Patent and Licensing Inc., Basking Ridge, NJ (US)

(72) Inventors: Anthony Delserro, Orange, CA (US); Anbazhagan Palani, Somerset, NJ (US); David Skuratowicz, Felton, CA (US); Mahabaleshwar Bhat, Cupertino, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 43 days.

(21) Appl. No.: 18/116,160

(22) Filed: Mar. 1, 2023

(65) Prior Publication Data

US 2024/0298072 A1 Sep. 5, 2024

(51) Int. Cl.
*H04N 21/466* (2011.01)
*H04N 21/2187* (2011.01)
*H04N 21/2668* (2011.01)
*H04N 21/45* (2011.01)
*H04N 21/475* (2011.01)

(52) U.S. Cl.
CPC ..... *H04N 21/4667* (2013.01); *H04N 21/2187* (2013.01); *H04N 21/2668* (2013.01); *H04N 21/4532* (2013.01); *H04N 21/4758* (2013.01)

(58) Field of Classification Search
CPC ........... H04N 21/2187; H04N 21/4532; H04N 21/2668
See application file for complete search history.

(56) References Cited

U.S. PATENT DOCUMENTS

| | | | |
|---|---|---|---|
| 10,897,647 B1 * | 1/2021 | Hunter Crawley | ........................ H04N 21/8547 |
| 11,570,218 B1 * | 1/2023 | Roberts | ............ H04N 21/47202 |
| 11,785,307 B1 * | 10/2023 | Roberts | ................. H04L 65/612 725/37 |
| 2012/0290951 A1 * | 11/2012 | Utsuki | .................... H04L 67/02 715/753 |
| 2013/0097635 A1 * | 4/2013 | Yerli | ................... H04N 21/2187 725/37 |
| 2014/0176665 A1 * | 6/2014 | Gottlieb | ................ H04L 65/403 709/204 |
| 2016/0353252 A1 * | 12/2016 | Krasadakis | ......... H04L 12/1845 |

(Continued)

*Primary Examiner* — Jason Salce

(57) ABSTRACT

An illustrative system includes a memory that stores instructions and a processor communicatively coupled to the memory and configured to execute the instructions to perform a process. The process may comprise monitoring audience engagement of a plurality of audience members with respect to the a stream event, generating, based on the monitoring of the audience engagement, a plurality of different generalized metrics associated with the plurality of audience members engaging with the live stream event, and providing for display to a presenter of the live stream event, a graphical user interface view that includes live video of the live stream event, an animation that includes icons indicative of reactions provided during the live stream event by at least some audience members included in the plurality of audience members, and the plurality of different generalized metrics associated with the plurality of audience members engaging with the live stream event.

19 Claims, 9 Drawing Sheets

(56) References Cited

U.S. PATENT DOCUMENTS

| | | | |
|---|---|---|---|
| 2022/0408122 A1* | 12/2022 | Khanna | H04N 21/4788 |
| 2023/0199231 A1* | 6/2023 | Fredette | H04N 21/21805 |
| | | | 725/105 |

* cited by examiner

LIVE STREAM EVENT MANAGEMENT SYSTEMS AND METHODS

BACKGROUND INFORMATION

As computer technology has advanced, various tools have been developed to facilitate users virtually interacting with one another by way of computer systems. For example, computing platforms have been developed to facilitate live streaming video and/or audio content to audience members during a live stream event (e.g., a video game live stream session, an all hands-on-deck corporate meeting, a webinar, etc.). During such a live stream event, audience members may interact with a presenter of the live stream event by providing comments, sending emoticons, etc. However, despite these interactions, it is often difficult for the presenter of the live stream event to adequately evaluate how engaged the audience members are with respect to the live stream event. In view of this, there remains room for improvement in implementing live streaming technologies.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
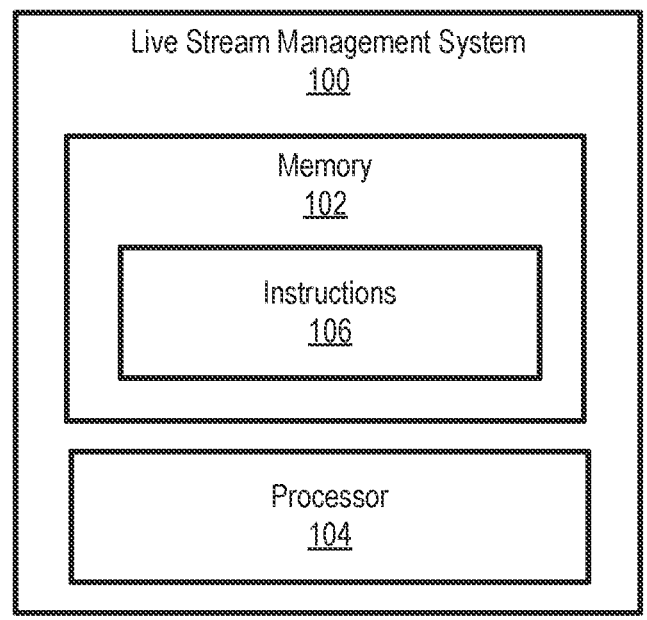
FIG. 1 shows an illustrative live stream management system according to principles described herein.

Live stream event management systems and methods are described herein. In certain examples, a live stream event may be hosted on a live streaming platform system. The live stream event may be conducted via a computing device of a presenter providing live streaming content to the live streaming platform system and the live streaming platform system providing, in real-time or near real-time as part of a live streaming session, the live streaming content to computing devices of audience members who access the live streaming event. In addition, the live streaming platform system may provide one or more features and/or tools (e.g., user interface features and/or tools) for use by the presenter and/or audience members to interact with the live streaming platform system, with the live streaming event or session, and/or with one another in relation to the live streaming event. Accordingly, the live streaming platform system may receive interactions of the presenter and/or audience members with the live streaming event and, based on those interactions, incorporate one or more of the interactions into the live stream event and/or provide one or more additional features and/or tools in relation to the live streaming event. In some examples, the additional features and/or tools may help a presenter, an audience member, a moderator, or another participant in the live streaming event to conveniently determine audience engagement with the live stream event in real-time or near real-time without interruption to the live streaming content, which may facilitate the presenter and/or moderator in providing an engaging live stream event.

In certain examples, for instance, an illustrative system may include a memory that stores instructions and a processor communicatively coupled to the memory and configured to execute the instructions to perform a process. The process may comprise monitoring audience engagement of a plurality of audience members with respect to the live stream event, generating, based on the monitoring of the audience engagement, a plurality of different generalized metrics associated with the plurality of audience members engaging with the live stream event, and providing, for display to a presenter of the live stream event, a graphical user interface view that includes live video of the live stream event, an animation that includes icons indicative of interactions provided during the live stream event by at least some audience members included in the plurality of audience members, and the plurality of different generalized metrics associated with the plurality of audience members engaging with the live stream event.

Various advantages and benefits are associated with the live stream event management systems and methods described herein. For example, systems and methods such as those described herein may facilitate real-time or near real-time monitoring of audience engagement with respect to a live stream event, may provide moderator insights on audience engagement, may provide robust reaction setting options to help visualization of reactions provided by audience members during the live stream event, and/or may leverage analytics to create more immersive and engaging live stream events. In addition, the systems and methods described herein may facilitate providing post live stream event metrics that may be used to analyze past live stream events and/or improve future live stream events. Moreover, the systems and methods described herein may provide or otherwise leverage a low latency, high frequency communications infrastructure to facilitate real-time or near real-time transmission of messages (e.g., messages indicative of audience engagement) between end user computing devices and a live streaming platform system during a live stream event. These and other benefits that may be provided by systems and methods described herein will be evident from the disclosure that follows.

FIG. 1 shows an illustrative live stream management system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. In some examples, system 100 may be implemented by one or more computing devices of a live streaming platform system. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store any suitable data associated with live stream events such as interaction data indicating of interactions with a live stream event. One example of interaction data is reaction data indicative of types of reactions (e.g., emoticons) provided by audience members during a live stream event, how many reactions are provided, receipt frequency of reactions, how many audience members are participating in a live stream event, questions information associated with questions asked by a presenter during a live stream event, response information associated with responses provided by audience members during a live stream event, comments information, settings information (e.g., animation theme settings), graphical user interface content, and/or any other suitable data.

Processor 104 may be configured to perform (e.g., execute instructions 106 stored in memory 102 to perform) various processing operations associated with managing a live stream event. For example, processor 104 may perform one or more operations described herein to provide one or more features and/or tools to one or more participants in the live stream event, such as by monitoring engagement with the live stream event, generating a plurality of different generalized metrics based on the monitored engagement, and providing one or more features and/or tools based on the monitored engagement and/or generated metrics. These and other operations that may be performed by processor 104 are described herein.

Figure 2:
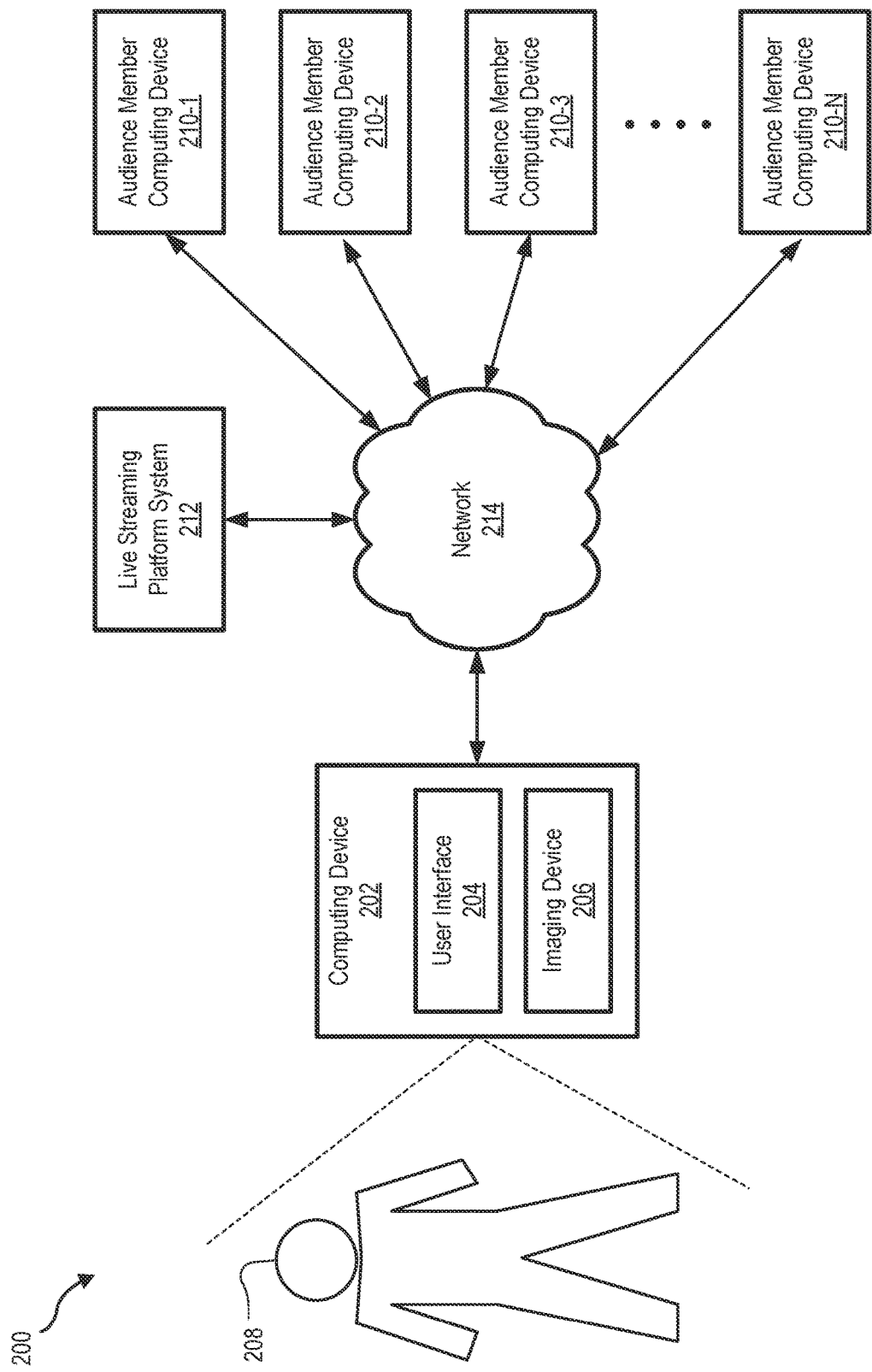
FIG. 2 shows an illustrative implementation of the live stream management system of FIG. 1 according to principles described herein.

System 100 may be implemented in any suitable manner. FIG. 2 shows an illustrative implementation 200 in which system 100 may be provided in certain examples. As shown in FIG. 2, implementation 200 includes a computing device 202 that includes a user interface 204 and an imaging device 206. Computing device 202 may include or be implemented by any suitable type of computing device or combination of computing devices as may serve a particular implementation. For example, computing device 202 may be implemented by a desktop computer, a laptop computer, a smartphone, a tablet computer, a head mounted display device, a virtual reality ("VR") device, an augmented reality ("AR") device, an internet-of-things ("IoT") device, and/or any other suitable device.

User interface 204 may correspond to any suitable type of user interface as may serve a particular implementation. For example, user interface 204 may correspond to a display device, a graphical user interface, a web interface (e.g., displayed by a display screen of a laptop computer), a holographic display interface, a VR interface, an AR interface, etc., or any combination of one or more such interfaces.

Imaging device 206 may correspond to any suitable type of imaging device that may be configured to capture images of a user 208 (also referred to herein as a presenter) during a live stream event. For example, imaging device 206 may include a camera or other type of image capture device that may be configured to capture video images of user 208 during a live stream event. As used herein, "images" may include any suitable type of image or images as may serve a particular implementation. For example, the images may include a single image (e.g., a still image), a moving image (e.g., a plurality of sequential images such as a video), and/or any other suitable type of image.

As shown in FIG. 2, computing device 202 is communicatively connected to any suitable number of audience member computing devices 210 (e.g., audience member computing devices 210-1 through 210-N) and a live streaming platform system 212 by way of a network 214. Audience member computing devices 210 may include any suitable computing device or system that may facilitate performing any of the operations described herein. In certain examples, an audience member computing device 210 may correspond to a desktop computer, a smartphone, a tablet computer, etc. that an audience member may use to engage with a live stream event and/or user 208 during the live stream event.

Live streaming platform system 212 may be associated with a live streaming platform service provider that hosts and/or facilitates live stream events such as those described herein. Live streaming platform system 212 may provide any suitable features and/or tools (e.g., user interface features and/or tools) for use by the user 208 and/or other participants in a live streaming event to interact with the live streaming platform system 212, with a live streaming event or session, with audience members, and/or with one another in relation to the live streaming event. Accordingly, live streaming platform system 212 may receive interactions of user 208 and/or audience members with the live streaming event and, based on those interactions, incorporate one or more of the interactions into the live stream event and/or provide one or more additional features and/or tools in relation to the live streaming event. Live streaming platform system 212 may include any suitable computing device or combination of computing devices as may serve a particular implementation. For example, live streaming platform system 212 may include one or more servers and/or other computing devices that may be configured to facilitate live stream events being provided by way of computing device 202 to audience member computing devices 210.

System 100 may be implemented by computing device 202 or live streaming platform system 212. Alternatively, system 100 may be distributed across audience member computing devices 210, computing device 202, and live streaming platform system 212, or distributed across audience member computing devices 210, computing device 202, live streaming platform system 212, and/or any other suitable computing system/device Network 214 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between audience member computing devices 210, live streaming platform system 212, and computing device 202. Communications between computing device 202, audience member computing devices 210, live streaming platform system 212, and any other system may be transported using any one of the above-listed networks, or any combination or sub-combination of the above-listed networks.

As will be described further herein, system 100 may be configured to perform one or more operations associated with managing a live stream event. As used herein, a "live stream event" may include any type of communication session where one or more live stream presenters may live stream audio and/or video content to a plurality of audience members. The audience members may use interfaces of their computing devices to join and participate in the live stream event, such as by consuming the live streaming audio and/or video content and optionally virtually interacting with the live stream event and/or presenter(s). For example, a live stream event may correspond to a video conference that is live streamed to one or more remotely located participants, a video blog, a media content viewing session (e.g., where a presenter live streams watching a movie or a television show), a live stream of a real world event such as a sporting event or a concert, a video game session where a player live streams his or her gameplay of a video game, etc.

As mentioned, it may be desirable to provide a presenter (e.g., user 208) of a live stream event with various tools/features that facilitate the presenter understanding how engaged a plurality of audience members are with respect to the live stream event. For example, system 100 may provide any suitable user interface tools/features or combination of user interface tools/features that may help the presenter understand the level of audience engagement at any given time during a live stream event. To that end, system 100 may be configured to track audience engagement during the live stream event and use information associated with the audience engagement to generate any suitable information such as metrics or combinations of metrics that show how engaged the audience members are during the live stream event.

Figure 3:
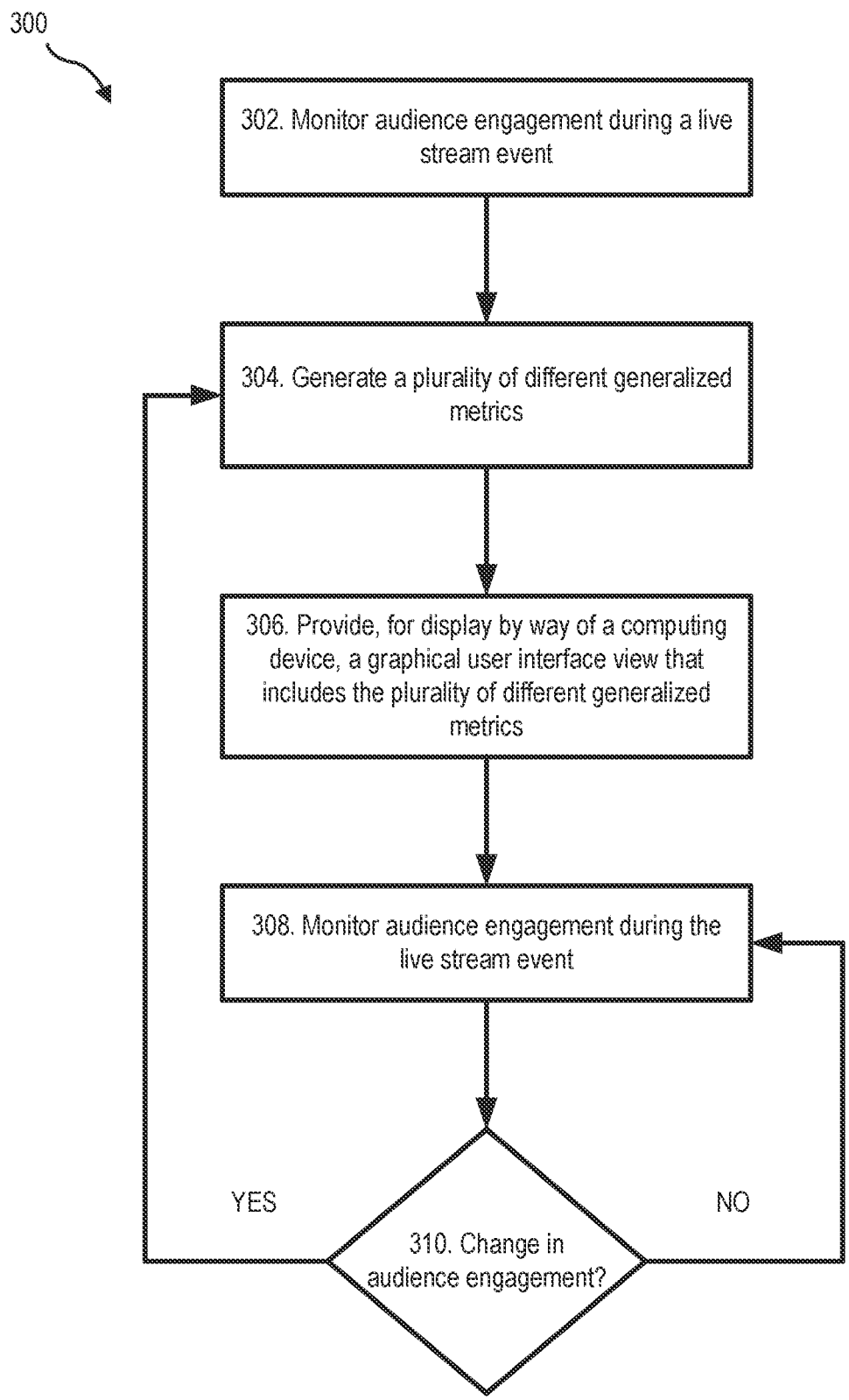
FIG. 3 shows an illustrative flow chart depicting various operations that may be performed according to principles described herein.

FIG. 3 depicts a flowchart 300 showing examples of operations that may be performed by system 100 to facilitate providing metrics associated with audience engagement with respect to a live stream event. At operation 302, system 100 may monitor, during the live stream event, audience engagement of a plurality of audience members (also referred to herein as viewers or users) with respect to the live stream event. This may be accomplished in any suitable manner. For example, system 100 may use and/or communicate with live streaming platform system 212 to monitor any suitable information associated with audience engagement during the live stream event. In such examples, computing device 202 and audience member computing devices 210 may interface with live streaming platform system 212 during the live stream event such that system 100 may use information obtained from live streaming platform system 212 to monitor the information. In certain implementations, system 100 may continually monitor the audience engagement during the live stream event. Alternatively, system 100 may periodically monitor the audience engagement during the live stream event. For example, system 100 may monitor the audience engagement at predetermined time intervals (e.g., every few milliseconds) in certain implementations.

In certain examples, system 100 may monitor the audience engagement based on communications between live streaming platform system 212 and audience member computing devices 210. Such communications may be transmitted in any suitable manner using any suitable communications protocol. For example, in certain implementations, the communications between live streaming platform system 212 and audience member computing devices 210 may be implemented by way of Representational State Transfer APIs ("RESTful APIs") and WebSocket Secure ("WSS") connections. RESTful APIs provide an interface to exchange information over the Internet and follow secure, reliable, and efficient software communication standards. WSS connections may facilitate sending/receiving messages between live streaming platform system 212 and audience member computing devices 210 without polling in real-time or near real-time. Together such RESTful APIs and WSS connections may provide a persistent, bi-directional, full-duplex Transmission Control Protocol ("TCP") connection from a web browser of audience member computing devices 210 to live streaming platform system 212.

With such a configuration, any engagement by an audience member with the live stream event may trigger a WebSocket message as well as result in the display of, for example, emoticons, comments, etc. to the presenter during the live stream event.

In monitoring the audience engagement, system 100 may collect any suitable information associated with how audience members interact with the live stream event. For example, the monitoring of the audience engagement by system 100 may include system 100 monitoring how many reactions (e.g., heart emoticons, thumbs up emoticons, smile emoticons, etc.) are provided by the audience members during the live stream event, which reactions are provided, how frequently reactions are provided during a given time period, how many comments are provided by audience members during the live stream event, how many audience members are currently participating the live stream event, how many questions have been asked by the presenter and/or audience members during the live stream event, how many responses have been provided by the presenter and/or audience members during the live stream event, and/or any other suitable information associated with the live stream event. To illustrate an example, during a live stream event, an audience member may send a chat message "Hi" to the presenter. Based on the message, system 100 may collect information regarding the name of the audience member, the content of the chat message, the audience member's role in the live stream event, a timestamp of when the chat was initiated, additional metadata for logging purposes, and/or any other suitable information.

System 100 may collect the information associated with audience engagement in any suitable manner. For example, system 100 may gather information from audience computing devices 210 by way of WebSocket messages in JavaScript Object Notation ("JSON") format. System 100 may store the information associated with audience engagement in a database such as DynamoDB (a NoSQL database that supports key-value document structure). In certain examples, all of the information associated with audience engagement may be collected in JSON format by way of RESTful APIs.

At operation 304, system 100 may generate, based on the monitoring of the audience engagement and during the live stream event, a plurality of different generalized metrics associated with the plurality of audience members engaging with the live stream event. As used herein, a "generalized metric" refers to a metric that is generalized for a plurality of audience members as a group and that is not a user-specific metric.

The generalized metrics generated by system 100 may include any suitable metric that may facilitate a presenter understanding how engaged audience members are during a live stream event. For example, the generalized metrics may include, but are not limited to, an engagement meter that visually displays a level of engagement of the plurality of audience members during the live stream event, a peak audience member indicator that indicates a highest number of audience members achieved during the live stream event, an average number of audience members indicator that indicates the average number of audience members during the live stream event, a total reactions indicator that indicates how many reactions have been received during the live stream event, a reactive audience members indicator that indicates what proportion (e.g., percentage) of audience members included in the plurality of audience members are reactively engaging with the live stream event (e.g., during the entire live stream event or during a defined segment of the live stream event such as in the last minute or five minutes of the live stream event), a most used reaction indicator that indicates a most used reaction during the live stream event, a total comments indicator that indicates how many comments have been received during the live stream event, a chat indicator that indicates what proportion (e.g., percentage) of audience members have provided comments during the live stream event, a questions asked indicator that indicates how many questions have been asked during the live stream event, a questions answered indicator that indicates what proportion (e.g., percentage) of audience members have answered questions during the live stream event, a poll response indicator that indicates how many responses have been received for a poll during the live stream event, a response proportion indicator that indicates what proportion (e.g., percentage) of audience members provided a response to the poll during the live stream event, and/or any other suitable generalized metric.

Figure 4:
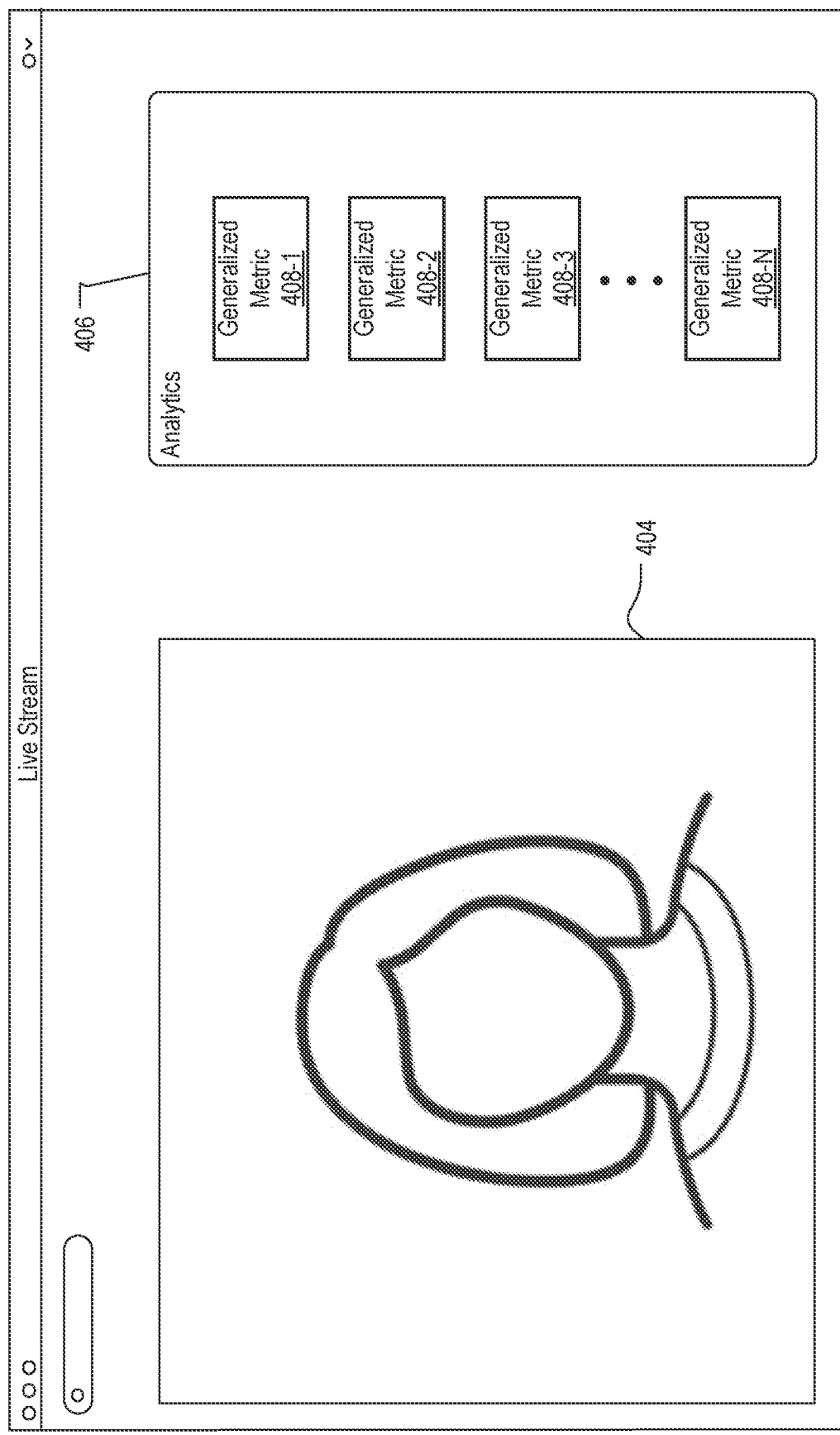
FIGS. 4-7 show illustrative graphical user interface views that may be provided for display during a live stream event according to principles described herein.

At operation 306, system 100 may provide, for display by way of a computing device (e.g., computing device 202), a graphical user interface view that includes one or more of the plurality of different generalized metrics. System 100 may provide the graphical user interface view for display in any suitable manner. To illustrate, FIG. 4 shows an illustrative graphical user interface view 402 that may be provided for display to user 208 by way of computing device 202 during a live stream event. As shown in FIG. 4, graphical user interface view 402 includes a first pane 404 that includes a live video of the live stream event and a second pane 406 that includes analytics information associated with the live stream event including a plurality of generalized metrics 408 (e.g., generalized metrics 408-1 through 408-N). Plurality of generalized metrics 408 may include any suitable generalized metric or combination of generalized metrics, such as those described herein, and any suitable number of generalized metrics as may serve a particular implementation. In addition, generalized metrics 408 may be arranged within second pane 406 in any suitable manner. An illustrative arrangement of generalized metrics is described further herein.

Figure 5:
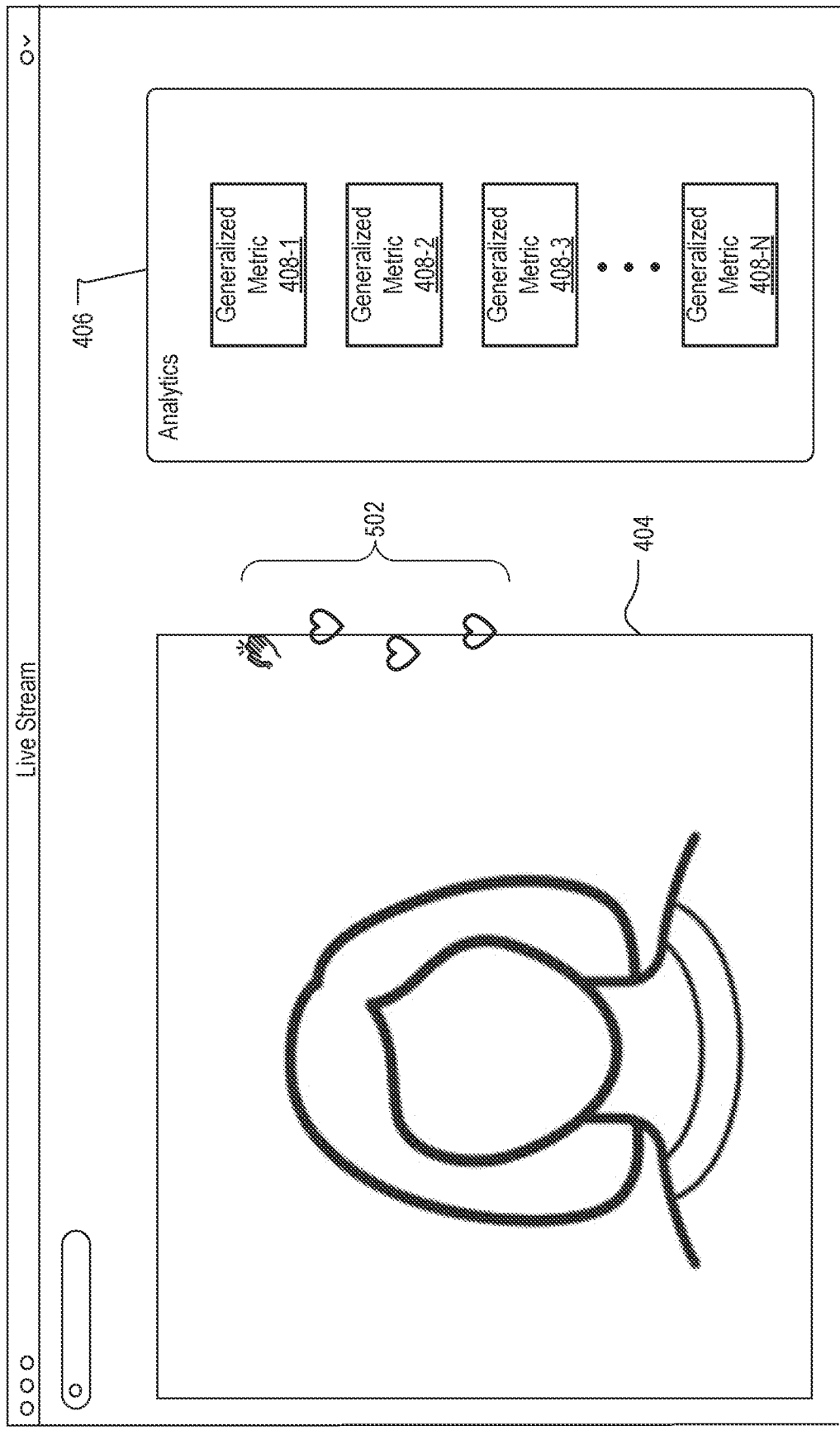

In certain examples, a graphical user interface view may further include an animation that includes icons indicative of reactions provided during the live stream event by at least some audience members included in a plurality of audience members. The animation may be represented within the graphical user interface view in any suitable manner. To illustrate, FIG. 5 shows an example where graphical user interface view 402 further includes an animation 502 that includes icons (e.g., heart icons, a clapping icon, etc.) that are indicative of reactions provided by audience members during the live stream event. In the example shown in FIG. 5, animation 502 may include the icons appearing at the bottom of first pane 404 and floating upward towards the top of first pane 404. As shown in FIG. 5, animation 502 is at least partially overlaid over the live video of the live stream event depicted in first pane 404. However, animation 502 may not be overlaid over the live video in certain alternative implementations. In certain examples, animation 502 may be provided for display to each of the audience members as well as to the presenter of the live stream event.

Returning to FIG. 3, because the audience engagement may change throughout the live stream event, system 100 may continue to monitor the audience engagement throughout the duration of the live stream event at operation 308. This may be accomplished in any suitable manner, such as described herein.

At operation 310, system 100 may detect whether there has been a change in the audience engagement of the plurality of audience members with respect to the live stream event. System 100 may detect the change in any suitable manner. For example, system 100 may detect the change based on a change in the number of audience members currently participating in the live stream event, an added comment and/or response to a question during the live stream event, one or more new reactions provided by audience members, and/or any other suitable change. If the answer at operation 310 is "NO," the flow may return to operation 308 and system 100 may continue to monitor the audience engagement. If the answer at operation 310 is "YES," the flow may return to operation 304 and system 100 may update at least one of the generalized metrics based on the change in the audience engagement. System 100 may then repeat operation 306 to provide the updated at least one of the generalized metrics for display to the presenter of the live stream event.

System 100 may continue to repeat operations 304-310 any suitable number of times during the live stream event to ensure that the plurality of generalized metrics represent a real-time or near real-time indication of the audience engagement with respect to the live stream event.

Figure 6:
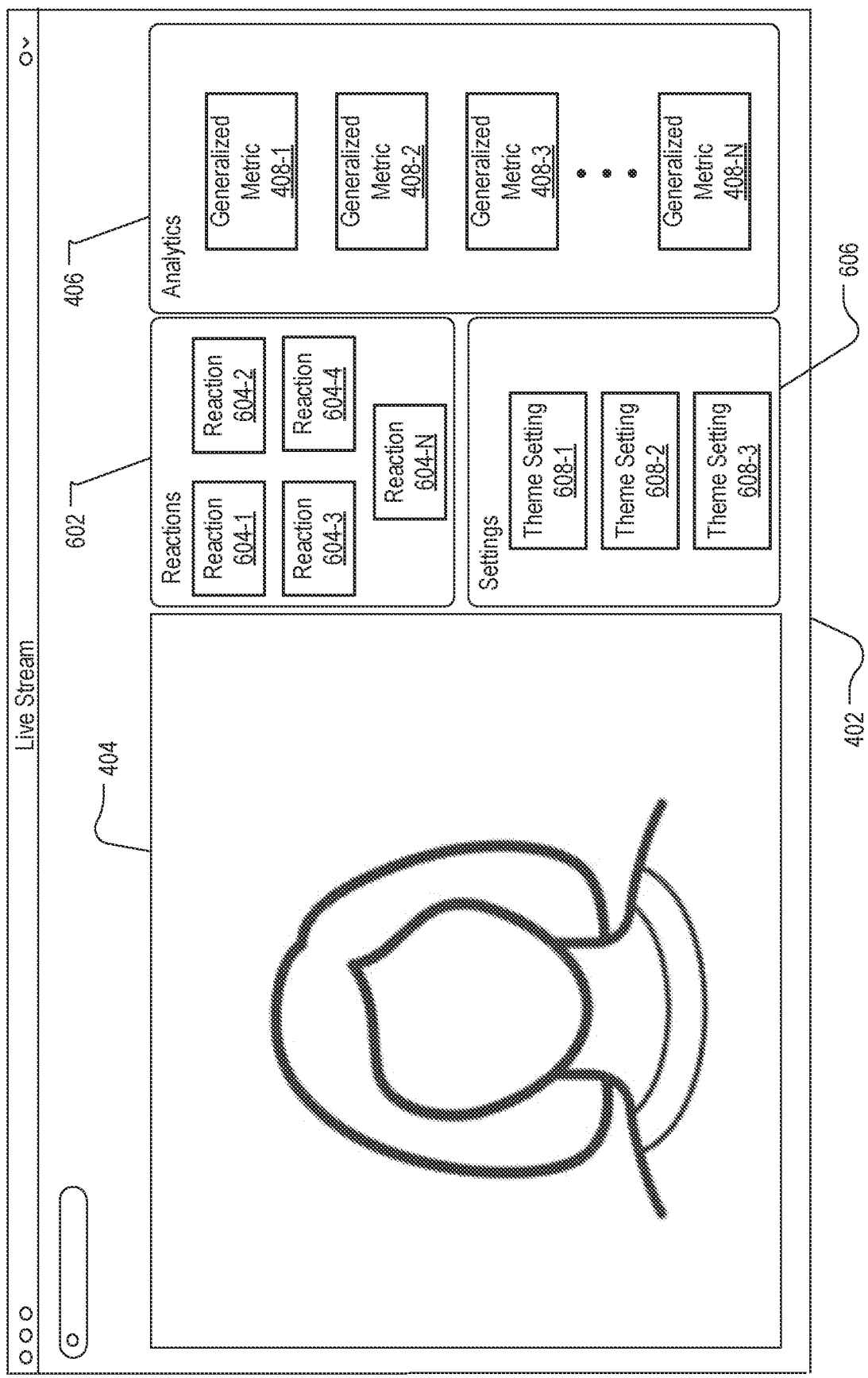

In certain examples, a graphical user interface view that may be provided for display to a presenter of a live stream event may further include a third pane that includes a plurality of reactions that are available to be provided by the plurality of audience members during the live stream event. To illustrate, FIG. 6 shows graphical user interface view 402 including a third pane 602 in addition to first pane 404 and second pane 406. As shown in FIG. 6, third pane 602 corresponds to a reactions pane that includes a plurality of reactions 604 (e.g., reactions 604-1 through 604-N) that are available to be provided by the plurality of audience members during the live stream event. Each of reactions 604 may be associated with an icon indicative of a corresponding reaction. For example, a heart icon may be associated with reaction 604-1, a smiley icon may be associated with reaction 604-2, and so forth. In certain examples, each reaction 604 may also include a numerical indicator that indicates how many times that particular reaction was received during the live stream event. Examples of icons and numerical indicators are described further herein.

In certain examples, the graphical user interface view that may be provided for display to a presenter of a live stream event may further include an additional pane that includes a plurality of user selectable animation theme options selectable to change a type of theme of the animation. To illustrate, FIG. 6 further includes an additional pane 606 that corresponds to a settings pane. As shown in FIG. 6, additional pane 606 includes a plurality of user selectable theme options 608 (e.g., animation theme options 608-1 through 608-3) that may be selectable by a presenter of a live stream event to change the type of theme of the animation. The plurality of user selectable animation theme options 608 may include any suitable number of animation theme options as may serve a particular implementation. Animation theme options 608-1, 608-2, and 608-3 may each correspond to a different type of animation that may be provided for display within a graphical user interface view.

For example, animation theme option 608-1 may result in a single icon being animated for each reaction received during the live stream event. Animation theme option 608-2 may be different from animation them option 608-1 in that animation theme option 608-2 may result in more than one icon being animated for each reaction received during the live stream event.

Although FIG. 6 depicts first pane 404, second pane 406, third pane 602, and additional pane 606 as being concurrently displayed within graphical user interface view 402, it is understood that in certain alternative implementations different combinations and/or arrangements of the panes may be represented within graphical user interface view 402. For example, in certain implementations, graphical user interface view 402 may include first pane 404, second pane 406, and third pane 602 but not additional pane 606. Alternatively, graphical user interface view 402 may include first pane 404, second pane 406, and additional pane 606 but not third pane 602.

Figure 7:
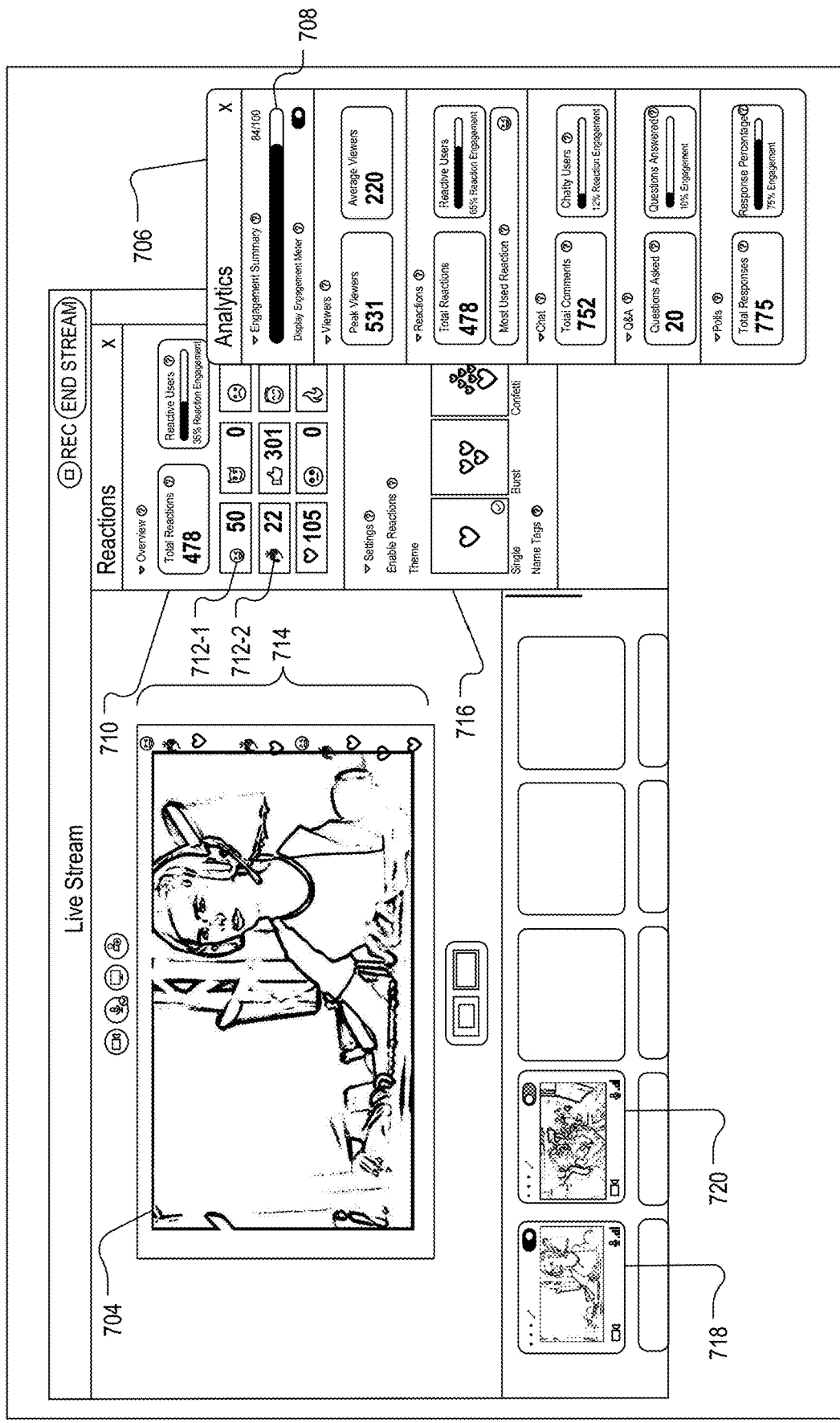

FIG. 7 shows an additional illustrative graphical user interface view 702 that may be provided for display by system 100 to a presenter during a live stream event such as a live stream of the presenter playing a computer game. As shown in FIG. 7, graphical user interface view 702 includes a first pane 704 that depicts a live video of the live stream event including an image of the presenter playing the computer game. Graphical user interface view 702 further includes a second pane 706 that depicts a plurality of different generalized metrics associated with the live stream event. For example, second pane 706 depicts an engagement meter 708 that visually displays a level of engagement of the plurality of audience members during the live stream event. In general, the more engaged audience members are with respect to various metrics (e.g., chat, reactions, polls, attendance, Q&A, etc.), the higher the engagement level shown on engagement meter 708 will be. The engagement level indicated by engagement meter 708 may be generated based on any suitable combination of information associated with the audience engagement. For example, the engagement level indicated on engagement meter 708 may be based on any suitable combination of the number of audience members, the number of reactions provided by the audience members, the frequency of reactions provided by audience members, a percentage or ratio of audience members who have provided reactions or other interactions, the number of chat messages sent within a given time, the number of audience members responding to each poll, the number of polls with active responses, the number of questions sent by audience members, the ratio of questions sent during a given time, and/or any other suitable information.

The information used by system 100 for engagement meter 708 may affect the engagement level in any suitable manner. For example, if audience members are pre-maturely leaving the live stream event, the engagement level may go down. Additionally or alternatively, the level of engagement may go up when reactions are flooding in, but may go down when audience members are not providing reactions. Additionally or alternatively, the engagement level may go down based on a gradual decline in the number of chat messages.

In certain examples, certain types of information used to generate the engagement level represented in engagement meter 708 may be weighted higher than other types of information. For example, the frequency of reactions received during a given time period may be weighted higher than the total number of reactions received.

Second pane 706 is shown as being a pop-out window in the example shown in FIG. 7. However, it is understood that second pane 706 may be arranged differently in certain alternative implementations. For example, second pane 706 may be arranged in the same window as first pane 704 such as is shown in the arrangement depicted in FIG. 6.

As shown in FIG. 7, graphical user interface view 702 further includes a third pane 710 that includes a plurality of icons 712 (e.g., icons 712-1, 712-2, etc.) that are representative of reactions provided during the live stream event. For example, third pane 710 includes a smile icon, a clapping icon, a heart icon, a devil icon, a thumbs up icon, a blank face icon, a frowny face icon, an angel icon, and a fire icon. The number, type, and/or arrangement of icons depicted in third pane 710 are shown for illustrative purposes only. It is understood that any suitable arrangement, number, and/or types of icons may be represented within third pane 710 as may serve a particular implementation. In certain examples, if a reaction is received during the live stream event that is associated with an icon not currently represented within third pane 710, system 100 may automatically add that icon to third pane 710.

Each icon 712 shown in third pane 710 also includes a numerical indicator showing how many times a reaction associated with the respective icon has been received during the live stream event. For example, third pane 710 indicates that fifty smile icons, 22 clapping icons, 105 heart icons, and 301 thumbs up icons have been received so far from audience members during the live stream event. Third pane 710 further includes a numerical indicator that shows the total number reactions provided in the form of icons or emoticons during the live stream event. In the example shown in FIG. 7, 478 total reactions have been received from audience members during the live stream event. Third pane 710 further includes a reactive audience member indicator that indicates what proportion (e.g., percentage) of audience members included in the plurality of audience members are reactively engaging with the live stream event. In the example shown in FIG. 7, the reactive audience member indicator includes a bar indicator as well as a notification that 35% of the audience members are reactively engaging with the live stream event.

As shown in FIG. 7, an animation 714 is provided for display together with the live video of the live stream event. In the example shown in FIG. 7, animation 714 may include the icons floating upward as they are received during the live stream event. For example, the heart icon on the bottom of the live video may move side to side and float upward toward the upper portion of graphical user interface view 702 after being received by system 100. However, the animation may include any suitable other animation as may serve a particular implementation.

As shown in FIG. 7, graphical user interface view 702 further includes a fourth pane 716 that includes a plurality of different animation themes that may be selectable by the presenter to change a visual appearance of animation 714. In the example shown in FIG. 7, the single animation theme is currently selected such that only one icon is displayed for each reaction that is received during the live stream event. A second option that may be alternatively selected is a burst option that results in, for example, three icons being displayed for each reaction that is received during the live stream event. A third option that may be alternatively selected is a confetti option that results in a confetti animation being displayed for each reaction that is received during the live stream event.

Fourth pane 716 further includes a name tag option that may be selected by a presenter to toggle the display of an audience member name tag together with an icon represented in animation 714. For example, when the name tags option is turned on, the audience member name tag of the user that provided the lowermost heart icon in FIG. 7 may be displayed together with the lowermost heart icon.

Fourth pane 716 also includes an option that is selectable by the presenter to toggle animation 714 on/off. When animation 714 is turned off, no reactions (e.g., icons, emoticons, etc.) may be displayed together with the live video in first pane 704 during the live stream event.

As shown in FIG. 7, panes 718 and 720 may represent different live videos that may be alternatively provided for display within first pane 704. Pane 718 represents the live video currently displayed within first pane 704 that shows the presenter playing the computer game. Pane 720 may correspond to either a live video of an additional presenter or a live video of the computer game itself. In the latter case, a smaller live video of the presenter may be overlaid over the live video of the computer game so that the audience members may see the gameplay of the computer game as well as a live video of the presenter.

It is understood that the generalized metrics and/or information/content depicted in graphical user interface view 702 show only a snapshot of the different generalized metrics and/or information/content that may be provided for display at a given time during the live stream event. As described herein, the generalized metrics and/or other information/content shown in FIG. 7 may be continually updated throughout the duration of the live stream event as the audience engagement changes. As a result, is possible to provide the presenter or any other party with a real-time or near real-time indication of how engaged the audience members are with respect to the live stream event.

In certain examples, system 100 may generate a live stream summary that includes the plurality of generalized metrics generated during the live stream event and that may be provided to the presenter or any other suitable party after the live stream event. Such a live stream summary may be presented in any suitable manner. For example, system 100 may provide, for display by way of the computing device of the presenter and after completion of the live stream event, an additional graphical user interface view that includes the plurality of generalized metrics generated during the live stream event. Through such a live stream summary, the presenter may be able to review the analytics associated with audience engagement and gain insights with respect to the live stream event that may facilitate improving future live stream events.

Figure 8:
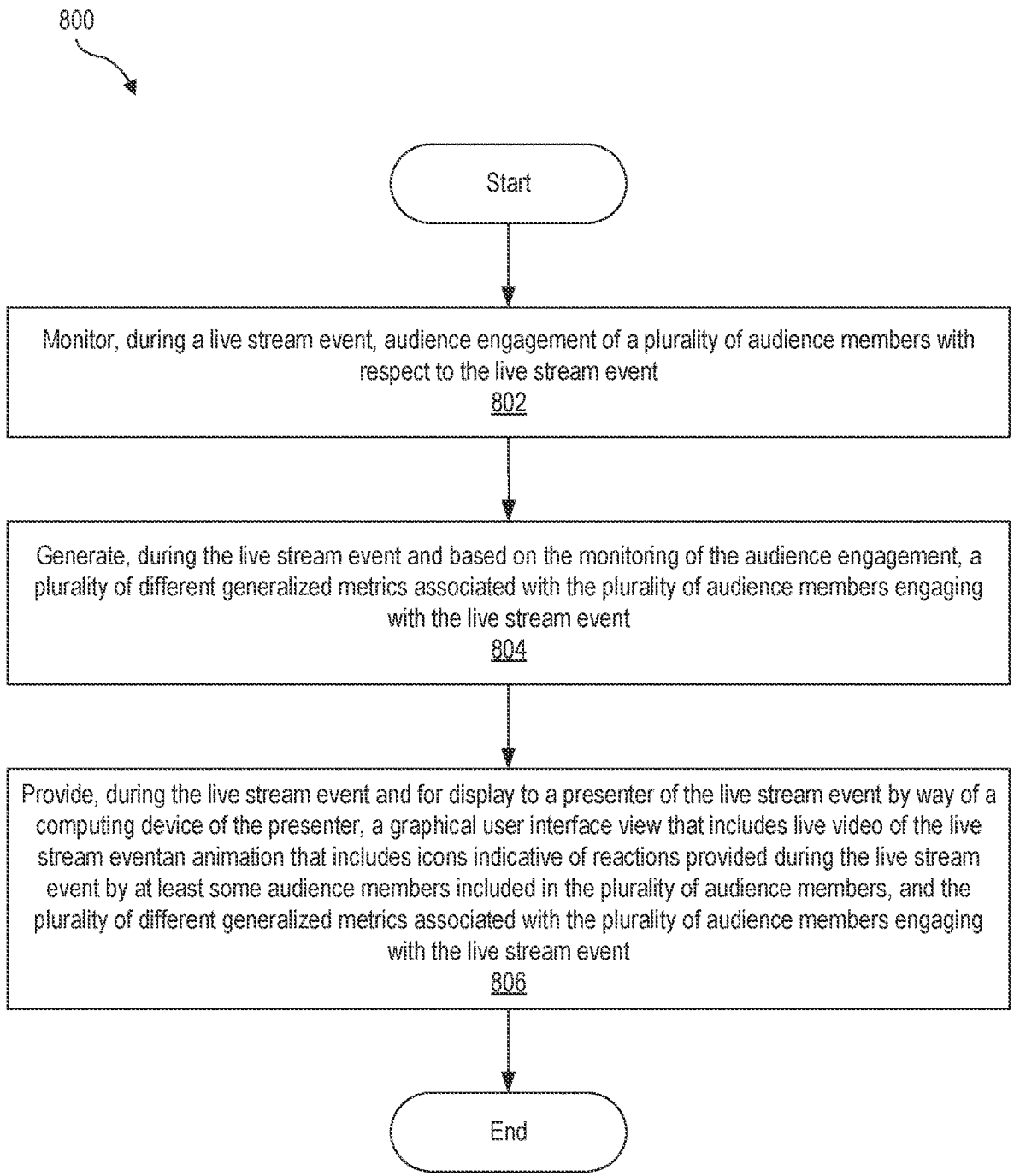
FIG. 8 shows an illustrative method for live stream event management according to principles described herein.

FIG. 8 illustrates an illustrative method 800 for live stream event management. While FIG. 8 shows illustrative operations according to one embodiment, other embodiments may add to and/or modify the operations shown in FIG. 8. The operations shown in FIG. 8 may be performed by system 100, any components included therein, and/or any implementation thereof.

At operation 802, a system (e.g., live stream management system 100) may monitor, during a live stream event, audience engagement of a plurality of audience members with respect to the live stream event. Operation 802 may be performed in any of the ways described herein.

At operation 804, the system may generate, during the live stream event and based on the monitoring of the audience engagement, a plurality of different generalized metrics associated with the plurality of audience members engaging with the live stream event. Operation 804 may be performed in any of the ways described herein.

At operation 806, the system may provide, during the live stream event and for display to a presenter of the live stream event by way of a computing device of the presenter, a graphical user interface view that includes live video of the live stream event an animation that includes icons indicative of reactions provided during the live stream event by at least some audience members included in the plurality of audience members, and the plurality of different generalized metrics associated with the plurality of audience members engaging with the live stream event. Operation 806 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Illustrative non-volatile storage media include, but are not limited to, read-only memory, flash memory, a solid-state drive, a magnetic storage device (e.g., a hard disk, a floppy disk, magnetic tape, etc.), ferroelectric random-access memory (RAM), and an optical disc (e.g., a compact disc, a digital video disc, a Blu-ray disc, etc.). Illustrative volatile storage media include, but are not limited to, RAM (e.g., dynamic RAM).

Figure 9:
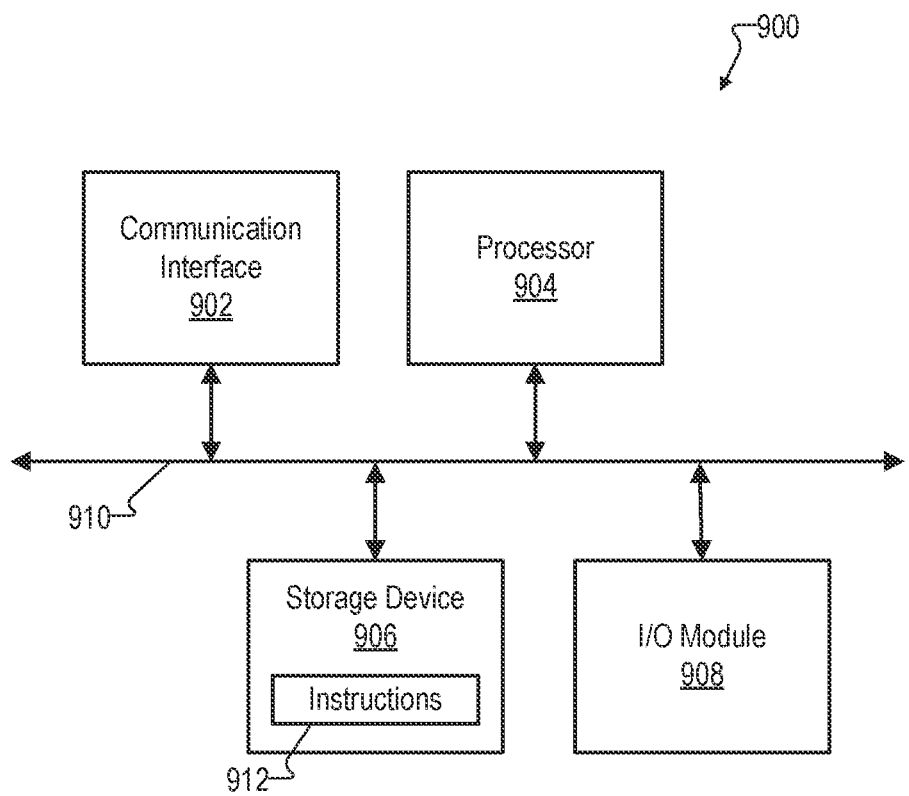
FIG. 9 shows an illustrative computing device according to principles described herein.

FIG. 9 shows an illustrative computing device 900 that may be specifically configured to perform one or more of the processes described herein. As shown in FIG. 9, computing device 900 may include a communication interface 902, a processor 904, a storage device 906, and an input/output (I/O) module 908 communicatively connected one to another via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data and/or interpreting, executing, and/or directing execution of one or more of the instructions, processes, and/or operations described herein. Processor 904 may perform operations by executing computer-executable instructions 912 (e.g., an application, software, code, and/or other executable data instance) stored in storage device 906.

Storage device 906 may include one or more data storage media, devices, or configurations and may employ any type, form, and combination of data storage media and/or device. For example, storage device 906 may include, but is not limited to, any combination of the non-volatile media and/or volatile media described herein. Electronic data, including data described herein, may be temporarily and/or permanently stored in storage device 906. For example, data representative of computer-executable instructions 912 configured to direct processor 904 to perform any of the operations described herein may be stored within storage device 906. In some examples, data may be arranged in one or more location databases residing within storage device 906.

I/O module 908 may include one or more I/O modules configured to receive user input and provide user output. One or more I/O modules may be used to receive input for a virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 900. For example, memory 102 may be implemented by storage device 906, and processor 104 may be implemented by processor 904.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a processor configured to execute instructions to perform a process comprising:
monitoring, during a live stream event, audience engagement of a plurality of audience members with respect to the live stream event;
generating, based on the monitoring of the audience engagement and during the live stream event, a plurality of different generalized metrics associated with the plurality of audience members engaging with the live stream event; and
providing, during the live stream event and for display to a presenter of the live stream event by way of a computing device of the presenter, a graphical user interface view that includes live video of the live stream event, an animation that includes icons indicative of reactions provided during the live stream event by at least some audience members included in the plurality of audience members, and the plurality of different generalized metrics associated with the plurality of audience members engaging with the live stream event,
wherein:
the graphical user interface view comprises a first pane that includes a plurality of user selectable animation theme options selectable to change a type of theme of the animation; and
the plurality of user selectable animation theme options includes a first user selectable animation theme option for the animation and a second user selectable animation theme option for the animation that is different than the first animation theme option.

2. The system of claim 1, wherein the process further comprises:
detecting, during the live stream event, a change in the audience engagement of the plurality of audience members with respect to the live stream event;
updating, based on the change in the audience engagement, at least one of the generalized metrics included in the plurality of generalized metrics; and
providing, during the live stream event and for display to the presenter of the live stream event by way of the computing device, the updated at least one of the generalized metrics within the graphical user interface view.

3. The system of claim 1, wherein the graphical user interface view further comprises:
a second pane that includes the live video of the live stream event; and
a third pane that includes the plurality of generalized metrics.

4. The system of claim 3, wherein the graphical user interface view further comprises a fourth pane that includes:
a plurality of icons indicative of reactions that are available to be provided by the plurality of audience members during the live stream event; and
a numerical indicator for each icon included in the plurality of icons that indicates how many times a reaction associated with each icon is received during the live stream event.

5. The system of claim 4, wherein the fourth pane further includes a total reactions indicator that indicates how many reactions have been received during the live stream event.

6. The system of claim 4, wherein the fourth pane further includes a reactive audience member indicator that indicates what proportion of audience members included in the plurality of audience members are reactively engaging with the live stream event.

7. The system of claim 1, wherein:
the first user selectable animation theme option results in a single icon being animated for each reaction received during the live stream event; and the second user selectable animation theme option results in more than one icon being animated for each reaction received during the live stream event.

8. The system of claim 1, wherein the graphical user interface view further includes a user selectable option to display an audience member name tag as part of the animation whenever an audience member included in the plurality of audience members provides a reaction during the live stream event.

9. The system of claim 1, wherein the animation that includes the icons indicative of reactions provided during the live stream event is at least partially overlaid over the live video of the live stream event.

10. The system of claim 1, wherein the process further comprises providing, for display by way of the computing device of the presenter and after completion of the live stream event, an additional graphical user interface view that includes the plurality of generalized metrics generated during the live stream event.

11. The system of claim 1, wherein the plurality of generalized metrics includes two or more of:
   an engagement meter that visually displays a level of engagement of the plurality of audience members during the live stream event;
   a peak audience member indicator that indicates a highest number of audience members achieved during the live stream event;
   an average number of audience members indicator;
   a total reactions indicator that indicates how many reactions have been received during the live stream event;
   a reactive audience members indicator that indicates what proportion of audience members included in the plurality of audience members are reactively engaging with the live stream event;
   a most used reaction indicator that indicates a most used reaction during the live stream event;
   a total comments indicator that indicates how many comments have been received during the live stream event;
   a chat indicator that indicates what proportion of audience members have provided comments during the live stream event;
   a questions asked indicator that indicates how many questions have been asked during the live stream event;
   a questions answered indicator that indicates what proportion of audience members have answered questions during the live stream event;
   a poll response indicator that indicates how many responses have been received for a poll during the live stream event; and
   a response proportion indicator that indicates what proportion of audience members provided a response to the poll during the live stream event.

12. A computer program product embodied in a non-transitory computer readable storage medium and comprising computer instructions for performing a process comprising:
   monitoring, during a live stream event, audience engagement of a plurality of audience members with respect to the live stream event;
   generating, based on the monitoring of the audience engagement and during the live stream event, a plurality of different generalized metrics associated with the plurality of audience members engaging with the live stream event; and
   providing, during the live stream event and for display to a presenter of the live stream event by way of a computing device of the presenter, a graphical user interface view that includes live video of the live stream event, an animation that includes icons indicative of reactions provided during the live stream event by at least some audience members included in the plurality of audience members, and the plurality of different generalized metrics associated with the plurality of audience members engaging with the live stream event,
   wherein:
      the graphical user interface view comprises a first pane that includes a plurality of user selectable animation theme options selectable to change a type of theme of the animation; and
      the plurality of user selectable animation theme options includes a first user selectable animation theme option for the animation and a second user selectable animation theme option for the animation that is different than the first animation theme option.

13. The computer program product of claim 12, wherein the process further comprises:
   detecting, during the live stream event, a change in the audience engagement of the plurality of audience members with respect to the live stream event;
   updating, based on the change in the audience engagement, at least one of the generalized metrics included in the plurality of generalized metrics; and
   providing, during the live stream event and for display by way of the computing device, the updated at least one of the generalized metrics within the graphical user interface view.

14. The computer program product of claim 12, wherein the plurality of generalized metrics includes an engagement meter that visually displays a level of engagement of the plurality of audience members during the live stream event.

15. The computer program product of claim 12, wherein the process further comprises providing, for display by way of the computing device and after completion of the live stream event, an additional graphical user interface view that includes the plurality of generalized metrics generated during the live stream event.

16. A method comprising:
   monitoring, by a live stream management system and during a live stream event, audience engagement of a plurality of audience members with respect to the live stream event;
   generating, by the live stream management system during the live stream event and based on the monitoring of the audience engagement, a plurality of different generalized metrics associated with the plurality of audience members engaging with the live stream event; and
   providing, by the live stream management system during the live stream event and for display to a presenter of the live stream event by way of a computing device of the presenter, a graphical user interface view that includes live video of the live stream event, an animation that includes icons indicative of reactions provided during the live stream event by at least some audience members included in the plurality of audience members, and the plurality of different generalized metrics associated with the plurality of audience members engaging with the live stream event,
   wherein:
      the graphical user interface view comprises a first pane that includes a plurality of user selectable animation theme options selectable to change a type of theme of the animation; and the plurality of user selectable animation theme options includes a first user selectable animation theme option for the animation and a second user selectable animation theme option for the animation that is different than the first animation theme option.

17. The method of claim 16, further comprising:

detecting, by the live stream management system and during the live stream event, a change in the audience engagement of the plurality of audience members with respect to the live stream event;

updating, by the live stream management system and based on the change in the audience engagement, at least one of the generalized metrics included in the plurality of generalized metrics; and providing, by the live stream management system during the live stream event and for display by way of the computing device, the updated at least one of the generalized metrics within the graphical user interface view.

18. The method of claim 16, wherein the plurality of generalized metrics includes an engagement meter that visually displays a level of engagement of the plurality of audience members during the live stream event.

19. The method of claim 16, further comprising:

providing, by the live stream management system for display by way of the computing device of the presenter and after completion of the live stream event, an additional graphical user interface view that includes the plurality of generalized metrics generated during the live stream event.

\* \* \* \* \*